Patented June 30, 1931

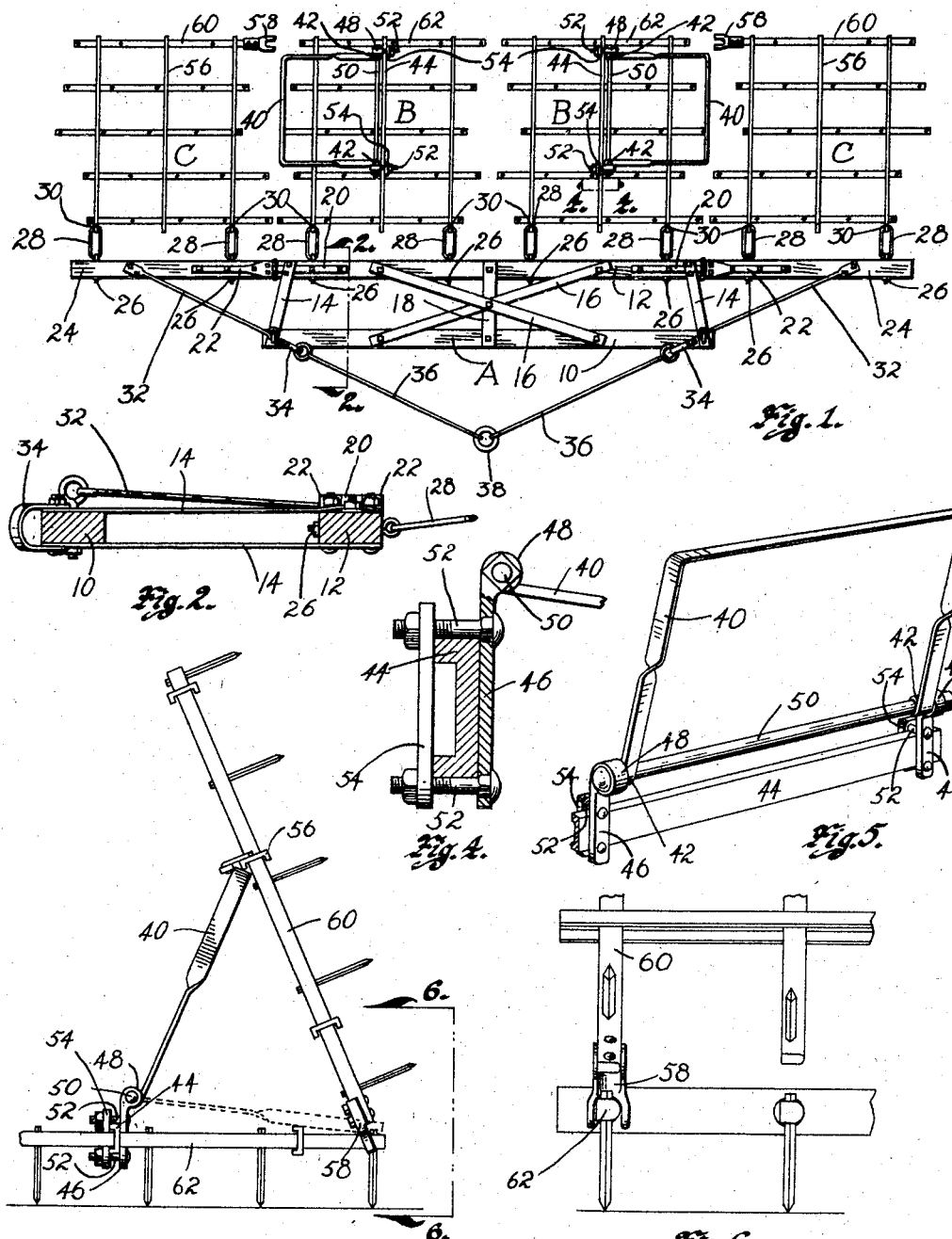

1,812,138

UNITED STATES PATENT OFFICE

FRANK W. CIHAK AND WILLIAM D. CIHAK, OF CRESTON, IOWA

FOLDING HARROW EVENER

Application filed May 5, 1928. Serial No. 275,460.

The object of our invention is to provide a folding harrow evener of simple, durable and inexpensive construction.

A further object of our invention is to provide a harrow evener adapted for connection to a plurality of harrow sections so that the end sections thereof may be raised to a partially folded position, whereby the over-all length of the harrow is sufficiently reduced to enable it to be pulled through the ordinary size of gate opening.

More particularly, it is an object of our invention to provide in connection with the folding evener, a pair of prop members pivotally mounted on the center sections of the harrow for the purpose of supporting the end sections thereof in partially folded position and to provide these prop members pivotally connected with the central section so that when the device is in unfolded position they may drop to a supine position on the central sections of the harrow.

Still another object is to provide on the end sections, fork members which may be moved to position for engaging the central sections of the harrow when the harrow is in partially folded position for thereby supporting the rear lower corners of the end sections of the harrow instead of letting them drag on the ground.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Fig. 1 is a plan view of our device illustrating it in connection with a four section harrow.

Fig. 2 is an enlarged detail sectional view on the line 2—2 of Fig. 1.

Fig. 3 is a rear end elevation of one of the end sections of the harrow and a portion of one of the central sections thereof illustrating the cooperation of the parts when the harrow is in partially folded position.

Fig. 4 is an enlarged sectional view on the line 4—4 of Fig. 1, illustrating the connection of one of the prop members to the central section of the harrow.

Fig. 5 is a perspective view of one of the prop members; and

Fig. 6 is an end elevation of a portion of Fig. 3 looking in the direction of the arrows on the line 6—6 adjacent Fig. 3.

On the accompanying drawings, we have used the reference character A to indicate generally, the harrow evener embodying our invention. The evener A consists of a front central bar 10 and a rear central bar 12. These bars are connected at their ends by strap members 14 above and below the bars, as clearly illustrated in Fig. 2 of the drawings. Brace members 16 and 18 serve to rigidly position one of the bars relative to the other and prevent their longitudinal movement relative to each other.

Hinge members 20 are secured to the ends of the bar 12 and pivotally connected with these members are hinge members 22. Secured to the hinge members 22 are end bars 24.

By means of eye bolts 26 and links 28, a plurality of harrow sections B and C are connected to the bars 12 and 24 respectively. The links 28 engage the hooks 30 ordinarily provided at the front edges of the harrow sections.

When in unfolded position, the outer ends of the end bars 24 are braced with respect to the center bars 10 and 12 by angularly arranged braces 32, which are secured to the bars 24 and pivotally secured to the bar 10. This pivotal connection is in alignment with the hinge pintle of the hinge members 20 and 22 so that binding of the parts is eliminated when the bars 24 are swung to raised position. By means of U-shaped clevis members 34, eye rods 36, and a ring 38, the entire structure may be pulled by a tractor or by horses.

From the foregoing description, it will be obvious that we have provided an evener for the four sections of the harrow, which, when in the position shown in Fig. 1, will serve to pull all of the harrow sections when a pulling force is exerted on the ring 38. Due to the hinge connection of the members 20 and 22, the bars 24 and the harrow sections C may be raised to an inclined position, as illustrated in Fig. 3. For maintaining the end sections C in this position, we provide prop members 40. These members may be made of flat or channel-shaped bars depending on the strength desired and are substantially U-shaped in formation. The ends of the two arms of the prop members 40 are formed into eyes 42 for the purpose of a pivot connection.

Secured to the central fore and aft connecting bars 44 of the harrow sections B are bracket members 46. These members are provided with eyes 48 and bolts 50 extending through these eyes and through the eyes 42 of the prop members 40, whereby a pivotal connection is provided. The brackets 46 are secured to the bars 44 by means of clamping bolts 52 and bars 54, as best illustrated in Fig. 4. Normally, the prop members 40 lie in supine position upon the central harrow sections B, as illustrated in Fig. 1 and as shown in dotted lines in Fig. 3.

When it is desirable to partially fold the end sections C for driving through a gate opening, the operator grasps the outer end of one of the sections C and raises it to the position shown in Fig. 3. During this operation he also raises the prop member 40 so that it may engage beneath the central fore and aft connecting bar 56 of the end section C.

When in this position, it is desirable to support the lower rear corners of the end sections C so that they will not drag on the ground. In order to do this, we provide fork members 58 secured to the rearmost bar 60 of the end harrow sections C. These fork members when the harrow is partially folded, engage over the rearmost of the bars 62 of the central harrow sections B, as clearly illustrated in Figs. 3 and 6.

From the foregoing description of our invention, it will be apparent that we have provided a folding evener with means in connection with the harrow sections for holding the end sections in partially folded position and supporting them with respect to the central sections of the harrow.

It is, of course, obvious that some changes may be made in the construction and arrangement of the parts of our device whereby it may be made for use in connection with three or five section harrows without departing from the real spirit and purpose of our invention. It can, in fact, be designed for any number of sections where it is desirable to fold the end sections over and it is our intention to cover by our claims, any modified forms of structure or use of mechanical equivalents, which may be reasonably included within their scope.

We claim as our invention:

1. For use with a folding harrow evener, a plurality of harow sections, means on one of the partially folded sections for holding another of the sections in position, said means comprising a prop member adapted to engage beneath one of the fore and aft connector bars of such other section whereby said last mentioned bar is retained thereagainst by gravity.

2. For use with a folding harrow evener, a plurality of harrow sections, means on one of the sections for holding another of the sections in partially folded position, said means comprising a prop member pivotally mounted and adapted when in operative position to engage beneath one of the fore and aft connector bars of such other harrow section whereby said last mentioned bar is retained thereagainst by gravity and when in inoperative position to lie in a supine position.

3. For use with a harrow evener and a plurality or harrow sections, an inverted U shaped prop member connected to one of the harrow sections for holding another of the sections in raised position relative thereto when the evener is moved to folded position, said prop member being pivotally mounted and adapted when in operative position to engage against a frame bar of such other section throughout a substantial portion of the length thereof and when in inoperative position to lie in a supine position.

4. A folding harrow prop structure comprising a pair of brackets adapted to be secured to a fore and aft connecting bar of a harrow section and a prop member of inverted U shape having the free ends of its arms pivoted to said brackets.

5. A folding harrow prop structure comprising a pair of brackets, means for clamping said brackets in spaced relation to a fore and aft connecting bar of a harrow section and a prop member having a pair of arms and a cross bar and having the free ends of its arms pivoted to said brackets.

6. For use with a hinged harrow evener and a plurality of harrow sections connected therewith, a prop member on one of the harrow sections for holding an end section in raised position relative thereto when the evener is moved to folded position, said prop member being substantially of inverted U shape with its two ends connected to one harrow section and its center engaging said end section when holding it in such raised position.

7. For use with a harrow evener and a plurality of harrow sections connected thereto and some of the sections provided at their rear corners with forked connecting and supporting means, a prop member comprising a horizontal center portion and arms extending at right angles from the ends thereof, the ends of said arms being pivotally connected to one of the harrow sections for holding another of the sections in raised position relative thereto when the evener is moved to folded position.

Des Moines, Iowa, April 21, 1928.
FRANK W. CIHAK.
WILLIAM D. CIHAK.